US009176667B2

(12) United States Patent
Yoon et al.

(10) Patent No.: US 9,176,667 B2
(45) Date of Patent: Nov. 3, 2015

(54) METHOD AND APPARATUS FOR VIRTUAL KEYPAD CONTROL (71) Applicant: Samsung Electronics Co., Ltd., Gyeonggi-do (KR)

(72) Inventors: Byoung-Uk Yoon, Gyeonggi-do (KR); Moon-Soo Kim, Seoul (KR); Yong-Sang Yun, Gyeonggi-do (KR); Seung-Eun Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 30 days.

(21) Appl. No.: 14/100,487

(22) Filed: Dec. 9, 2013

(65) Prior Publication Data

US 2014/0173492 A1    Jun. 19, 2014

(30) Foreign Application Priority Data

Dec. 14, 2012  (KR) .......................... 10-2012-0145954

(51) Int. Cl.
*G06F 3/0488* (2013.01)

(52) U.S. Cl.
CPC ................................ *G06F 3/04886* (2013.01)

(58) Field of Classification Search
CPC ................................................... G06F 3/04886
See application file for complete search history.

(56) References Cited

U.S. PATENT DOCUMENTS

| 6,323,846 | B1 | 11/2001 | Westerman et al. | |
|---|---|---|---|---|
| 2008/0316183 | A1* | 12/2008 | Westerman et al. | 345/173 |
| 2012/0113007 | A1* | 5/2012 | Koch et al. | 345/168 |
| 2012/0119997 | A1* | 5/2012 | Gutowitz | 345/168 |
| 2013/0187831 | A1* | 7/2013 | Sirpal et al. | 345/1.3 |
| 2013/0234942 | A1* | 9/2013 | Yoo et al. | 345/168 |

FOREIGN PATENT DOCUMENTS

| KR | 10-2005-0016691 A | 2/2005 |
|---|---|---|
| KR | 10-2012-0030840 A | 3/2012 |

* cited by examiner

*Primary Examiner* — Gerald Johnson
(74) *Attorney, Agent, or Firm* — Cha & Reiter, LLC (57) ABSTRACT

A method is provided including detecting that a first key in a virtual keypad is pressed, the first key being associated with a first symbol, determining, by an electronic device, whether a predetermined input is received after the first key is pressed, reconfiguring the virtual keypad, without displaying the first symbol, when the predetermined input is received; and displaying the first symbol when the predetermined input is not received.

20 Claims, 13 Drawing Sheets

METHOD AND APPARATUS FOR VIRTUAL KEYPAD CONTROL

CROSS-REFERENCE TO RELATED APPLICATION(S)

The present application claims the benefit under 35 U.S.C. §119(a) to a Korean patent application filed in the Korean Intellectual Property Office on Dec. 14, 2012, and assigned Serial No. 10-2012-0145954, the entire disclosure of which is hereby incorporated by reference.

TECHNICAL FIELD

The present disclosure relates generally to virtual keypads, and more particularly to method and apparatus for virtual keypad control.

BACKGROUND

As it has become common among users to consume multimedia services on portable devices, the problem of utilizing screen space efficiently has drawn increasing attention. Key to efficient screen utilization is the provision of well thought-out virtual keypad interfaces that do not occupy excessive amounts of screen space and are easily hidden from view when needed. However, at present, virtual keypads very often fail to satisfy these criteria. For example, when a user places his/her finger on a virtual keypad in an attempt to hide the virtual keypad from view, the portable terminal displaying the virtual keypad may often misinterpret the user's touch as a virtual keypad input and perform an incorrect input operation instead. Furthermore, sometimes, virtual keypads can be too large in size, thus occupying screen space that is better used for multimedia presentation.

Accordingly, the need exists for new interfaces for controlling virtual keypads in electronic devices.

SUMMARY

The present disclosure addresses this need. According to one aspect of the disclosure, a method for providing a virtual keypad in an electronic device is provided, comprising: detecting that a first key in the virtual keypad is pressed, the first key being associated with a first symbol; determining, by the electronic device, whether a predetermined input is received after the first key is pressed; reconfiguring the virtual keypad, without displaying the first symbol, when the predetermined input is received; and displaying the first symbol when the predetermined input is not received.

According to another aspect of the disclosure, an electronic device, comprising: a touchscreen configured to display a virtual keypad; and a processor configured to: detect that a first key in the virtual keypad is pressed, the first key being associated with a first symbol; determine whether a predetermined input is received after the first key is pressed; reconfigure the virtual keypad, without displaying the first symbol on the touchscreen, when the predetermined input is received; and display the first symbol on the touch screen when the predetermined input is not received. According to another aspect of the present invention, a method for controlling a virtual keypad in an electronic device includes detecting a plurality of key inputs; determining whether the detected key inputs comprise at least one index key; and when the detected key inputs comprise the at least one index key, deactivating key input of a virtual keypad.

According to another aspect of the present invention, a method for controlling a virtual keypad in an electronic device includes detecting a touch on at least one index key; and detecting a drag on the at least one index key touched, changing a shape of a virtual keypad.

According to yet another aspect of the present invention, an electronic device for controlling a virtual keypad includes at least one processor; at least one memory; and at least one program stored in the memory and configured for execution by the at least one processor. The program includes at least one instruction for detecting a plurality of key inputs, determining whether the detected key inputs comprise at least one index key, and when the detected key inputs comprise the at least one index key, deactivating key input of a virtual keypad.

According to still another aspect of the present invention, an electronic device for controlling a virtual keypad includes at least one processor; at least one memory; and at least one program stored in the memory and configured for execution by the at least one processor. The program includes at least one instruction for detecting a touch on at least one index key, and when detecting a drag on the at least one index key touched, changing a shape of a virtual keypad.

BRIEF DESCRIPTION OF THE DRAWINGS

The above and other aspects, features, and advantages of the present disclosure will be better understood from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of the disclosure as defined by the claims and their equivalents. It includes various specific details to assist in that understanding but these are to be regarded as mere examples. Accordingly, those of ordinary skill in the art will recognize that various changes and modifications of the examples described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used to enable a clear and consistent understanding of the disclosure. Accordingly, it should be apparent to those skilled in the art that the following examples are provided for illustrative purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
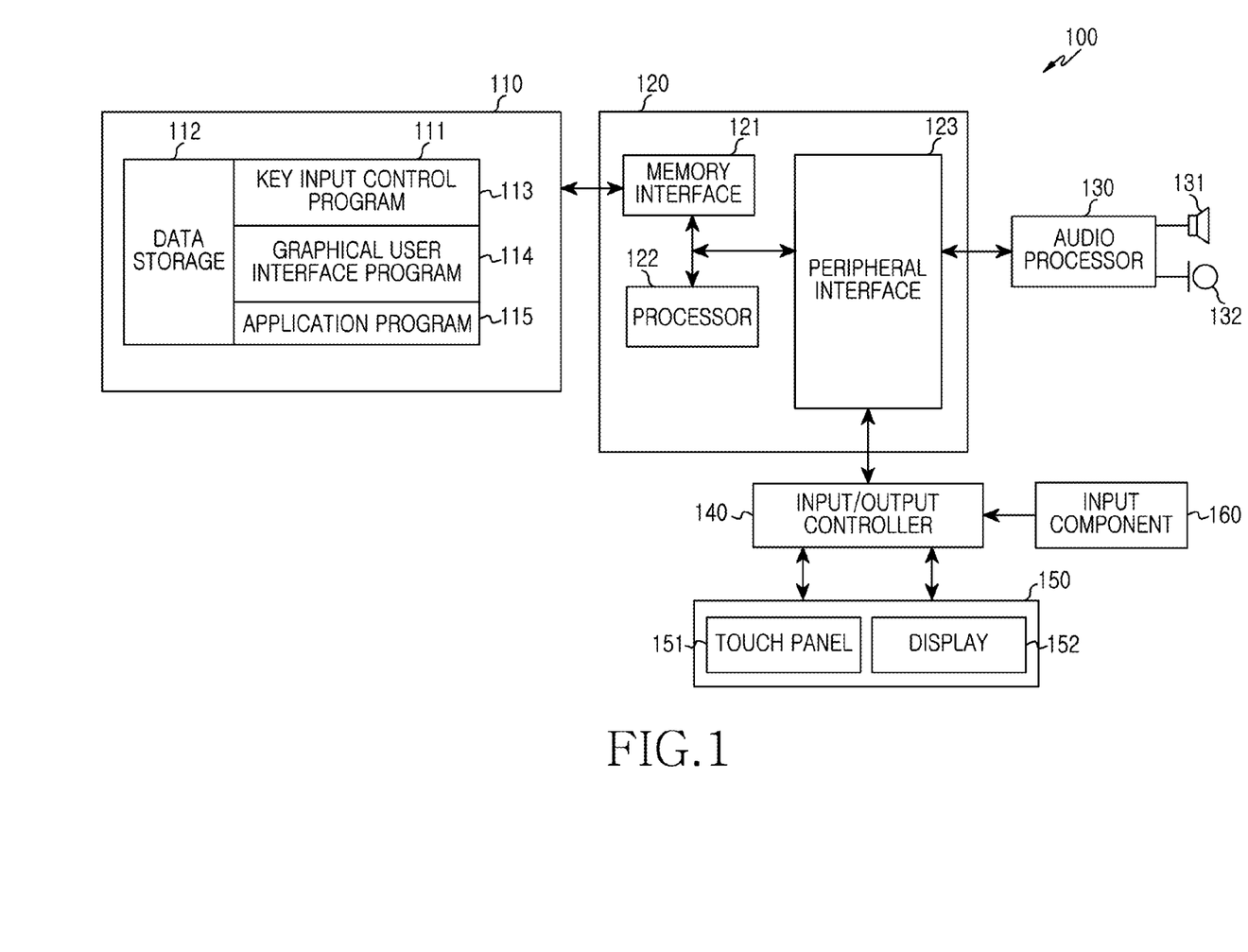
FIG. 1 is a block diagram of an electronic device according to aspects of the disclosure.

FIG. 1 is a block diagram of an electronic device 100 according to aspects of the disclosure. The electronic device 100 can include a memory 110, a processor 120, an audio processor 130, an input/output controller 140, a touch screen 150, and an input component 160. The memory 110 can include random access memory (RAM), read-only memory (ROM), a hard drive (HD), a solid state drive (SSD), a flash memory, and/or any suitable type of volatile and/or non-volatile memory. In some aspects, the memory 110 may include a program storage 111 for storing programs for controlling the operation of the electronic device 100, and a data storage 112 for storing data generated as a result of executing the program. For example, the program storage 111 can include a key input control program 113, a graphical user interface (GUI) program 114, and at least one application program 115. Each of the programs may include one or more processor-executable instructions that are executed by the processor 120.

In some implementations, the key input control program 113 may include processor-executable instructions for enabling and disabling a virtual keypad that is displayed on the touch screen 150. For example, when a key in the virtual keypad is touched, pressed or being near-touched (hovered) to input, the key input control program 113 may determine whether the key has been designated as a first index key. If the key is the first index key, the input control program 113 may determine whether a second index key is input within a predetermined time period from the inputting of the first index key. When the second index key is input by being touched, pressed or near-touched (hovered) within the predetermined time period, the key input control program 113 may deactivate the virtual keypad. In some implementations, deactivating the virtual keypad may include hiding the keypad and/or otherwise disabling the keypad. Referring briefly to the example of FIG. 7A, when a virtual keypad 709 detects a touch on the "F" key 701 and another touch on the "J" key 711 that is performed within a predetermined period of time from the touch of the "F" key 701, the key input control program 113 may recognize that the "F" key 701 and the key "J" key 711 are not pressed for the purpose of typing the letters "J" and "F" into the program 721 and accordingly the key input program 113 may deactivate the virtual keypad 709.

Figure 7A:
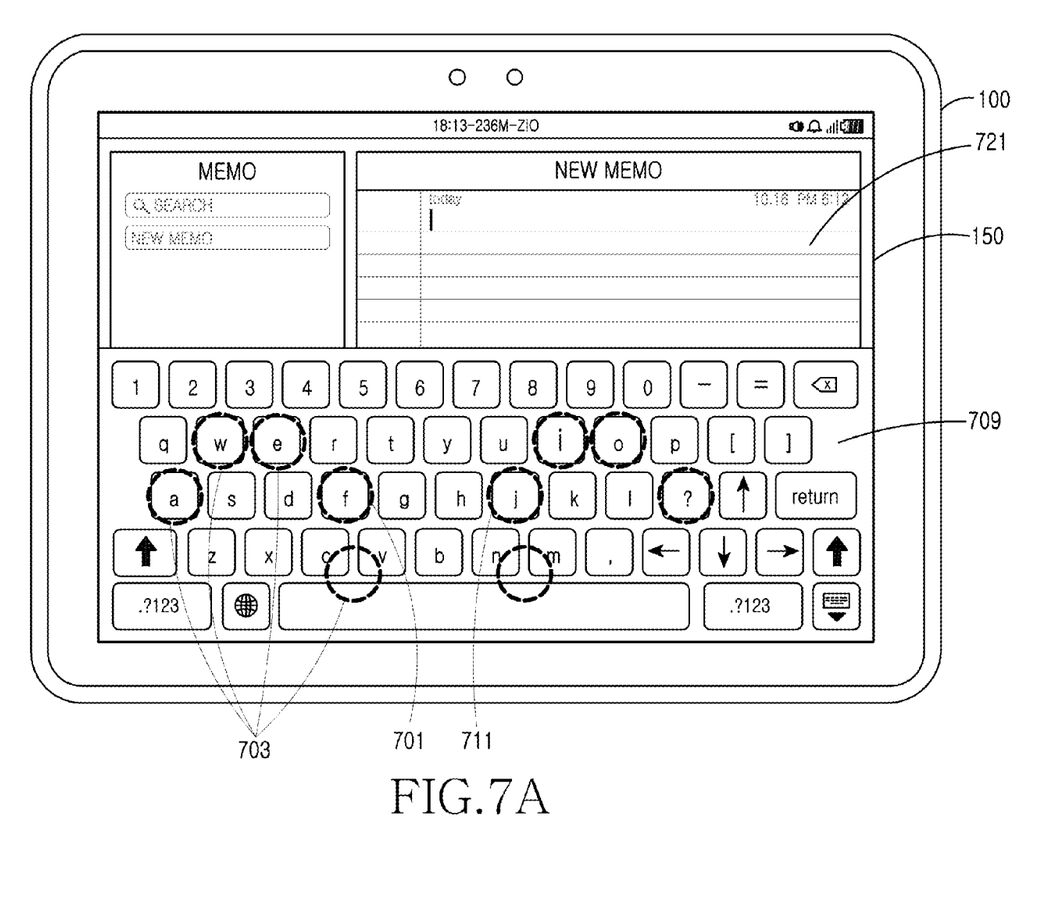
FIG. 7A, FIG. 7B, FIG. 7C, FIG. 7D and FIG. 7E are diagrams of virtual keypads according to aspects of the disclosure.
Figure 7B:
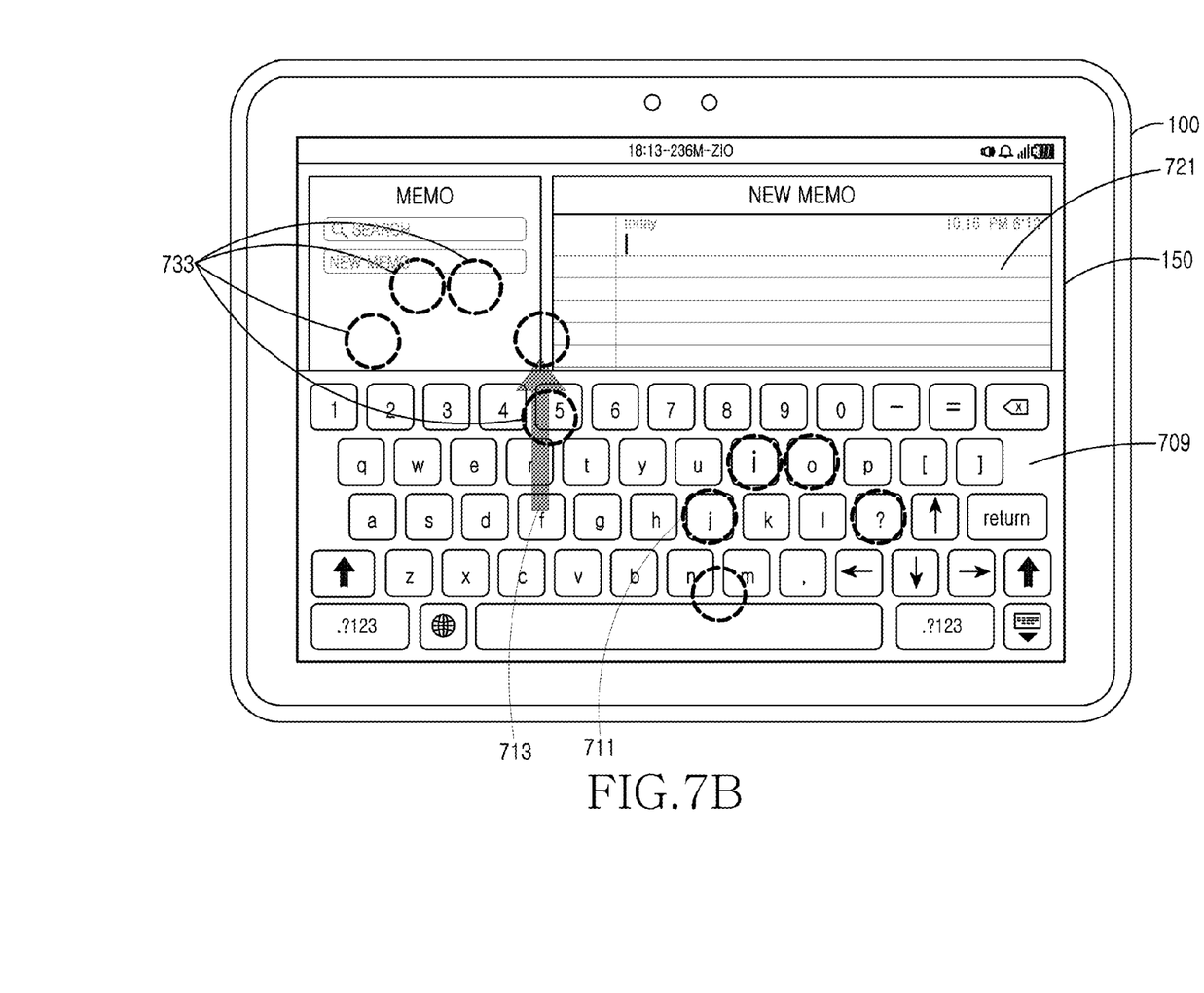
Figure 7C:
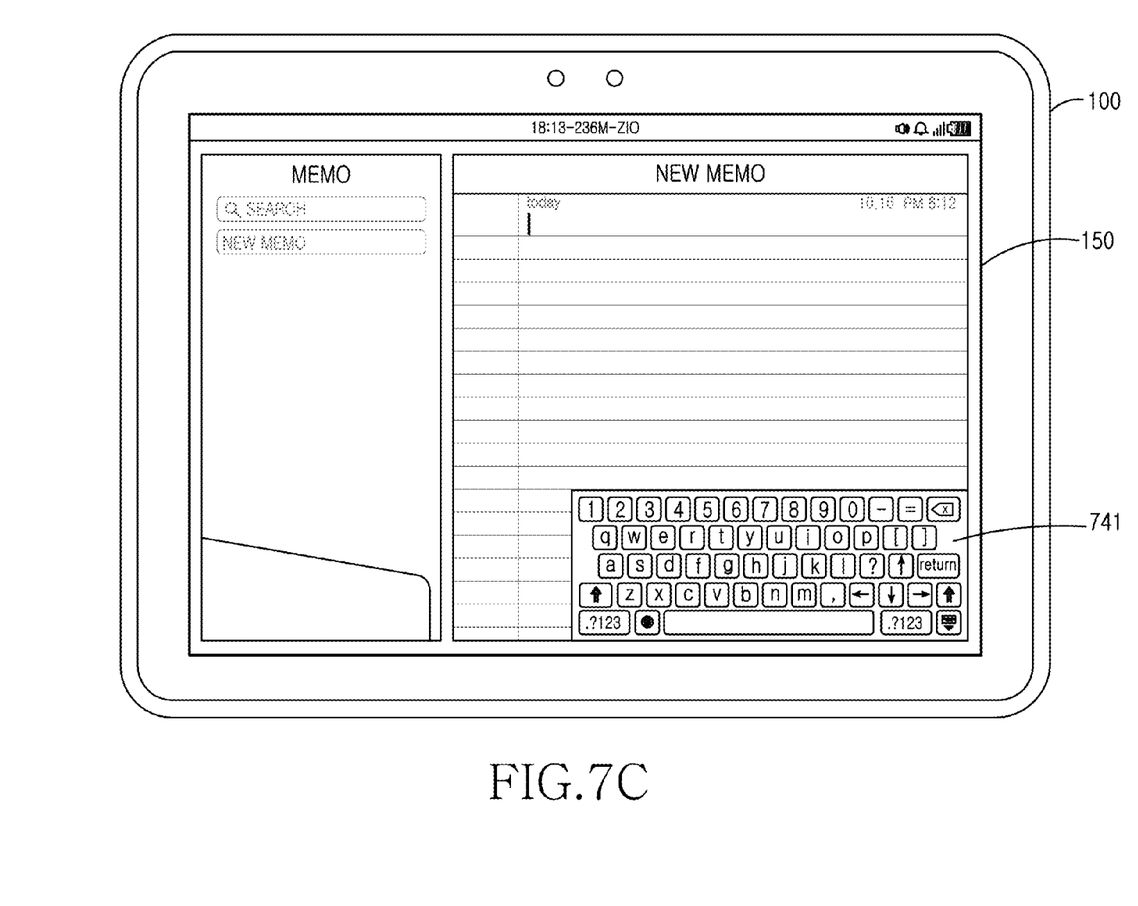
Figure 7D:
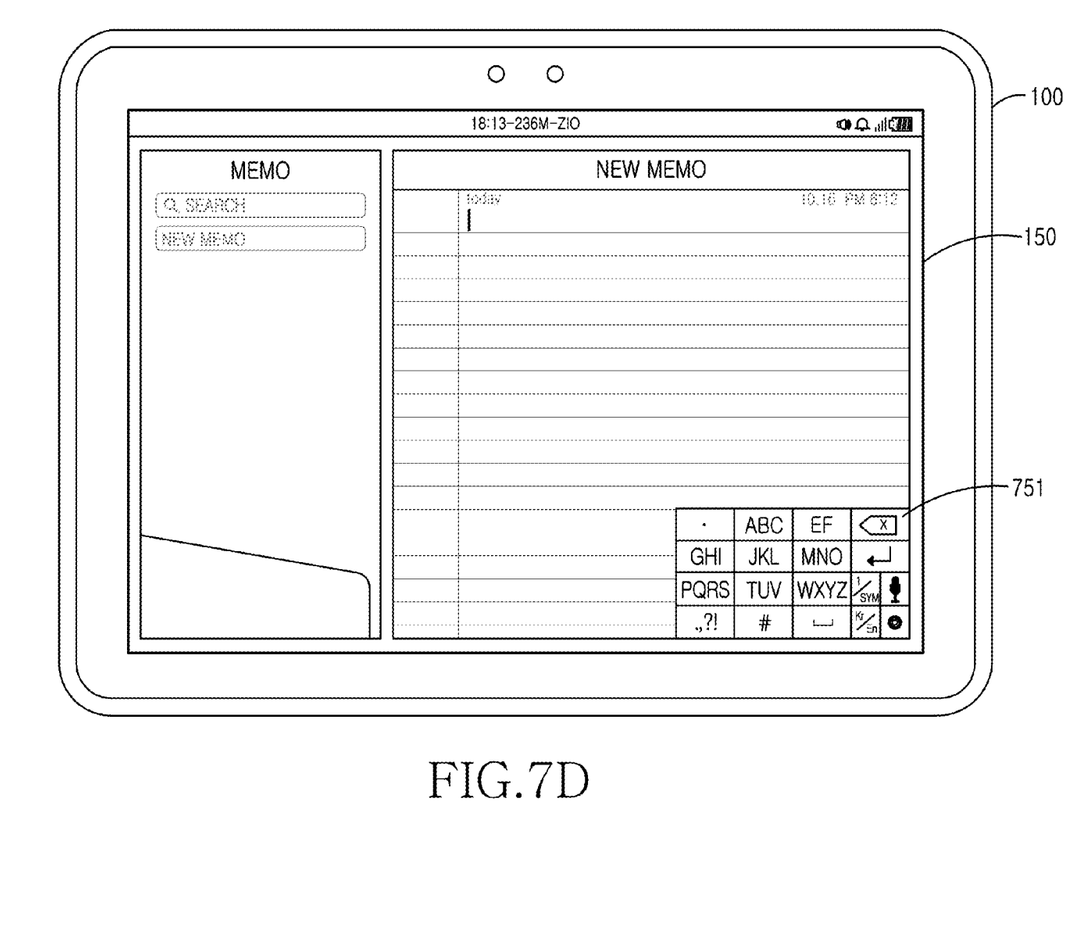

Additionally or alternatively, in some implementations, the key input control program 113 may include processor-executable instructions for changing the size of the virtual keypad. For example, the key input control program 113 may detect a drag on at least one index key. In response to detecting the drag, the key input control program 113 can change the size of the virtual keypad. More specifically, in the example of FIGS. 7A-E, the key input program 113 detects a drag that is performed by a user resting his/her fingers on the keys 703 and then sliding the fingers to locations 733. Next, the key input control program 113 determines whether the drag is performed on a predetermined index key of the virtual keypad 709, such as the "F" key 701. When the drag is performed on the predetermined index key, the key input control program 113 recognizes this as an instruction to change the size of the virtual keypad. For example, the key input control program 113 may reduce the size of the virtual keypad by replacing the virtual keypad 709 with one of the keypads 741 and 751, which are smaller in size, as shown in FIGS. 7C and 7D.

Additionally or alternatively, in some implementations, the key input control program 113 may include processor executable instructions for changing the shape of the virtual keypad. For example, when a preset index key is dragged in a downward direction, the key input control program 113 may replace the virtual keypad 709 with the keypad 751, as shown in FIG. 7D. Although both keypads 709 and 751 are rectangular in shape, they have different proportions. As another example, when the preset index key is dragged in an upward direction, the key input control program 113 may replace the virtual keypad 709, which has a rectangular shape, with another keypad, such as the special-purpose keypad 761, which has a circular shape. Thus, in some instances, the new shape of the virtual keypad may depend on a direction in which the index key is dragged. Additionally or alternatively, in some instances, the relationships between drag directions and keypad shapes may be set by the user. As such, indications of those relationships may be received at the device 100 as user input.

Additionally or alternatively, in some implementations, the key input control program 113 may determine a position for displaying the virtual keypad based on a direction of a drag of a preset index key. For example, when the detected drag is performed to the left of the index key, the key input control program 113 may display the virtual keypad at a first location. As another example, when the detected drag is performed to the right of the index key, the key input control program 113 may display the virtual keypad at a second location that is different from the first location.

The GUI program 114 can include processor-executable instructions for providing a graphical user interface on the touch screen 150. For example, when the key input control program 113 triggers a virtual keypad display event, the GUI program 114 can display the virtual keypad on the display component 152. For example, when the key input control program 113 triggers a virtual keypad change event, the GUI program 114 may display the changed virtual keypad on the display component 152 of the touchscreen 150. As discussed above, a virtual keypad change event may be triggered when one or more predetermined index keys are pressed or dragged. As noted, any key that is part of the keypad may be designated as an index key, in some implementations.

The application program 115 can include any suitable type of software application that is capable of being executed by the electronic device 100 (e.g., a scheduler application, a banking application, a text messaging application, etc.).

The processor 120 may include an x86 processor, an ARM-based processor, and or any suitable type of electronic circuitry for controlling the operation of the electronic device 100. Additionally or alternatively, in some implementations, the processor 120 may include a memory interface 121, at least one processor 122, and a peripheral interface 123. At least some of the memory interface 121, the processor 122, and the peripheral interface 123 of the processor 120 can be integrated together into a single component (e.g. an integrated circuit) or implemented as separate components. The memory interface 121 may control access to the memory 110 by the processor 122 or peripheral interface 123. The peripheral interface 123 may include circuitry for connecting an input/output peripheral of the electronic device 100 to the processor 122 and/or the memory interface 121. In some instances, the processor 120 may be configured to provide various multimedia services. In so doing, the processor 120 may execute at least one program for providing multimedia services that is stored in the memory 110.

The audio processor 130 may include electronic circuitry for providing an audio interface between the user and the electronic device 100 through a speaker 131 and a microphone 132. The input/output controller 140 may include electronic circuitry for providing an interface between the input/output device such as touch screen 150 and input component 160, and the peripheral interface 123.

The touchscreen 150 may include a touch panel 151 and a display 152. The touch panel 151 may be configured to provide touch information to the processor 120 via the input/output controller 140. The touch panel may receive input via a digital pen or a user's finger(s). The display 152 may include a liquid crystal display (LCD) or any other suitable type of display. The display part 152 may be configured to display status information of the electronic device 100, a character input by the user, a moving picture, and a still picture. Notably, the display 152 may be used to display the virtual keypad discussed above. Although in this example the touch panel 151 and display 152 are integrated together, in other examples they may be separate devices. Furthermore, any other suitable input component may be used in the place of the touch panel 151, such as in instances where the virtual keypad is projected, rather than displayed on the display 152.

The input component 160 may include a physical button or keypad for controlling the electronic device 100. For example, the input component 160 may include a physical keypad for receiving the input data from the user. Although not shown in FIG. 1, the electronic device 100 can include electronic circuitry for transmitting and receiving data over one or more communications networks. For example, the communication networks may include, not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, and a Near Field Communication (NFC) network. In some implementations, communication component may include different sub-components for accessing different types of networks (e.g., GSM and Wireless LAN).

Figure 2:
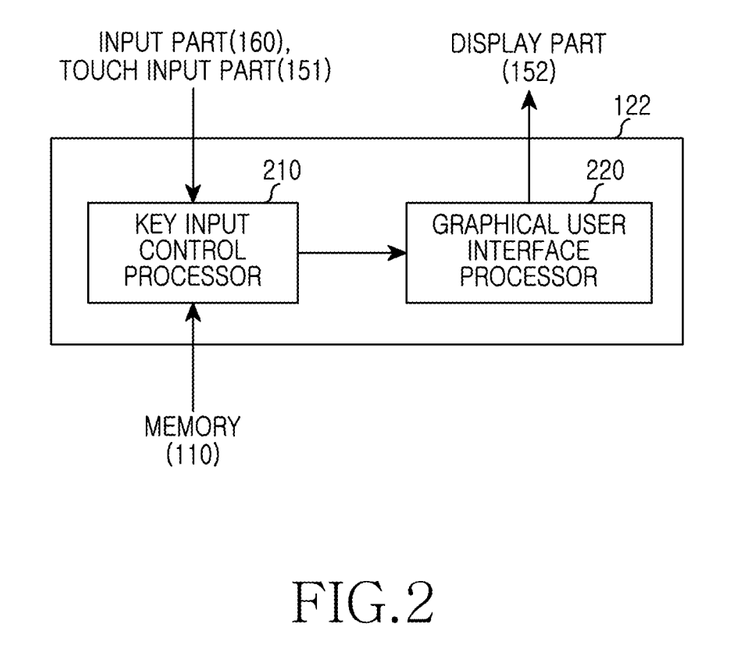
FIG. 2 is a block diagram of a processor according to aspects of the disclosure.

FIG. 2 is a block diagram of the processor 122 according to aspects of the disclosure. In some implementations, the processor 122 can include a key input control processor 210 and a GUI processor 220. The key input control processor 210 may be configured to control the state of the virtual keypad. In some implementations, the key input control processor 210 may include electronic circuitry that is configured enable or disable a virtual keypad that is displayed on the touch screen 150. For example, when a key in the virtual keypad is pressed, the key input control processor 210 may determine whether the pressed key has been designated as a first index key. If the pressed key is the first index key, the key input control processor 210 may determine whether a second index key is pressed within a predetermined time period from the pressing of the first index key. When the second index key is pressed within the predetermined time period, the key input control processor 210 may deactivate the virtual keypad. In some implementations, deactivating the virtual keypad may include hiding the keypad and/or otherwise disabling the keypad. Referring briefly to the example of FIG. 7A, when a virtual keypad 709 detects a touch on the "F" key 701 and another touch on the "J" key 711 that is performed within a predetermined period of time from the touch of the "F" key 701, the key input control processor 210 may recognize that the "F" key 701 and the key "J" key 711 are not pressed for the purpose of typing the letters "J" and "F" into the program 721 and accordingly the key input control processor 210 may deactivate the virtual keypad 709.

Additionally or alternatively, in some implementations, the key input control processor 210 may include electronic circuitry configured to change the size of the virtual keypad. For example, the key input control processor 210 may detect a drag on at least one index key. In response to detecting the drag, the key input control processor 210 can change the size of the virtual keypad. More specifically, in the example of FIGS. 7A-E, the key input control processor 210 detects a drag that is performed by a user resting his/her fingers on the keys 703 and then sliding the fingers in a particular direction. Next, the key input control processor 210 determines whether the drag is detected on a predetermined index key of the virtual keypad 709, such as the "F" key 701. When the drag is detected on the predetermined index key, the key input control processor 210 recognizes this as an instruction to change the size of the virtual keypad. For example, the key input control processor 210 may reduce the size of the virtual keypad by replacing the virtual keypad 709 with one of the keypads 741 and 751, which are smaller in size, as shown in FIGS. 7C and 7D.

Additionally or alternatively, in some implementations, the key input control processor 210 may include electronic circuitry configured to change the shape of the virtual keypad. For example, when a preset index key is dragged in a downward direction, the key input control processor 210 may replace the virtual keypad 709 with the keypad 751, as shown in FIG. 7D. Although both keypads 709 and 751 are rectangular in shape, they have different proportions. As another example, when the preset index key is dragged in an upward direction, the key input control processor 210 may replace the virtual keypad 709, which has a rectangular shape, with another keypad, such as the special-purpose keypad 761, which has a circular shape. Thus, in some instances, the new shape of the virtual keypad may depend on a direction in which the index key is dragged. Additionally or alternatively, in some instances, the relationships between drag directions and keypad shapes may be set by the user. As such, indications of those relationships may be received at the device 100 as user input.

Additionally or alternatively, in some implementations, the key input control processor 210 may include electronic circuitry configured to determine a position for displaying the virtual keypad based on a direction of a drag of an index key. For example, when the detected drag is performed to the left of the index key, the key input control processor 210 may display the virtual keypad at a first location. As another example, when the detected drag is performed to the right of the index key, the key input control processor 210 may display the virtual keypad at a second location that is different from the first location.

In some implementations, the GUI processor 220 may be configured to render a graphical user interface on the display component 152 of the touchscreen 150. The user interface, as noted above, may include the virtual keypad. Although in this example, the key input control processor 210 may process input received via the touch panel 151 to recognize keys in the virtual pad that are pressed, in other examples, this function may be delegated to a dedicated hardware component.

Figure 3A:
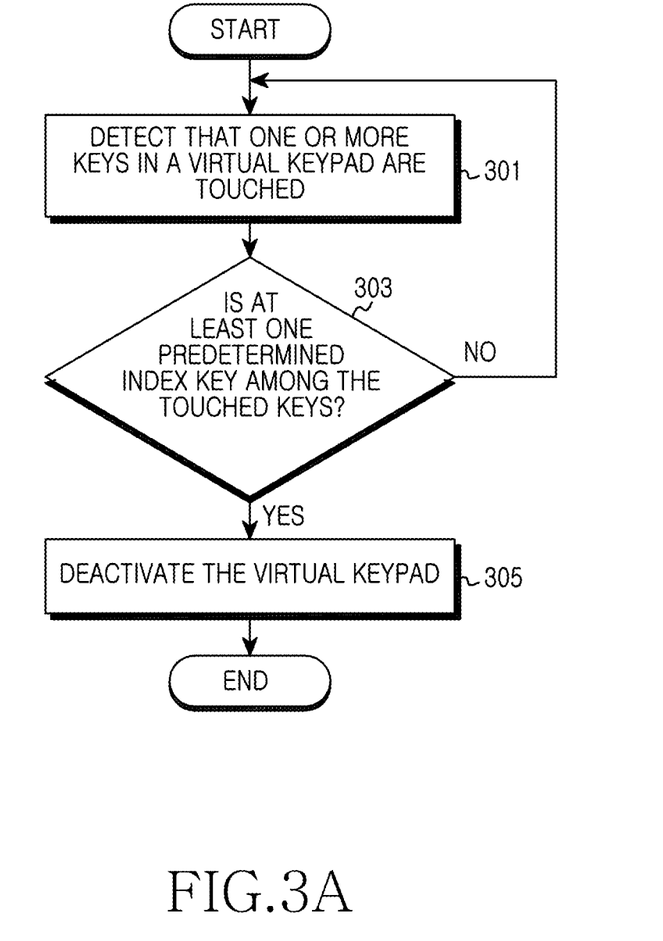
FIG. 3A is a flowchart of a method for reconfiguring a virtual keypad according to aspects of the disclosure.

FIG. 3A is a flowchart of a method for reconfiguring a virtual keypad according to aspects of the disclosure. In step 301, the electronic device 100 detects one or more key inputs that are made via the virtual keypad during a predetermined period of time. In step 303, the electronic device determines whether the key inputs include at least one preset index key. When it is determined that the key inputs include at least one preset index key, the electronic device deactivates the virtual keypad, at step 305. Otherwise, the process returns to step 301.

For example and without limitation, upon detecting that virtual input is received via the virtual keypad, the electronic device may determine whether the "F" key 701 and the "J" key 711 of the virtual keypad 709 have been activated (e.g., pressed) by the user within a predetermined period of time. More particularly, the electronic device may obtain a time at which the "F" key is touched and a time at which the "J" key is touched and determine whether the two touch times are within a predetermined temporal distance from one another. When it is determined that the two touch times are within the predetermined temporal distance from one another, the electronic device deactivates the virtual keypad.

Figure 3B:
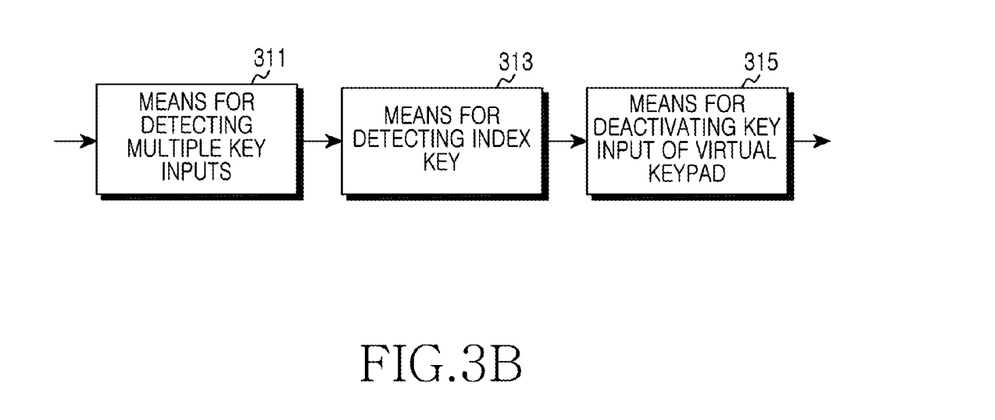
FIG. 3B is a diagram of an electronic device according to aspects of the disclosure.

FIG. 3B depicts an example of an electronic device according to aspects of the disclosure. Referring to FIG. 3B, the electronic device can include a first means 311 for detecting a plurality of key inputs, a second means 313 for detecting at least one index key, and a third means 315 for deactivating the key input of the virtual keypad. The first means 311 detects a key input including at least two keys. For example, the electronic device detects the multiple key inputs which are input through the virtual keypad 709 within a predetermined time period as discussed with respect to FIG. 7A.

The second means 313 determines whether at least one index key is detected in the electronic device. For example, the electronic device determines whether the virtual keypad 709 detects the touch on the "F" key 701 and the touch on the "J" key 711 within the first reference time as shown in FIG. 7A. Herein, it is assumed that the "F" key 701 and the "J" key 711 are the preset index keys.

The third means 315 deactivates the key input of the virtual keypad in the electronic device. For example, when the virtual keypad 709 detects the touch on the "F" key 701 and the "J" key 711 as shown in FIG. 7A, the electronic device determines whether the input time of the "F" key 701 and the "J" key 711 falls within the predetermined time period. That is, when the virtual keypad 709 detects the touch on the "F" key 701 and the touch on the "J" key 711, the electronic device determines whether the touch time of the "F" key 701 and the touch time of the "J" key 711 fall within the predetermined time period. When the input of at least two index keys is detected within the predetermined time period, the electronic device aborts the key input in step 305. For example, when the virtual keypad 709 detects the touch on the "F" key 701 and then the touch on the "J" key 711 within the predetermined time period as shown in FIG. 7A, the electronic device recognizes that the touches on the "F" key 701 and the "J" key 711 are not for the touch input. Thus, the electronic device deactivates the key input of the virtual keypad 709.

Figure 4:
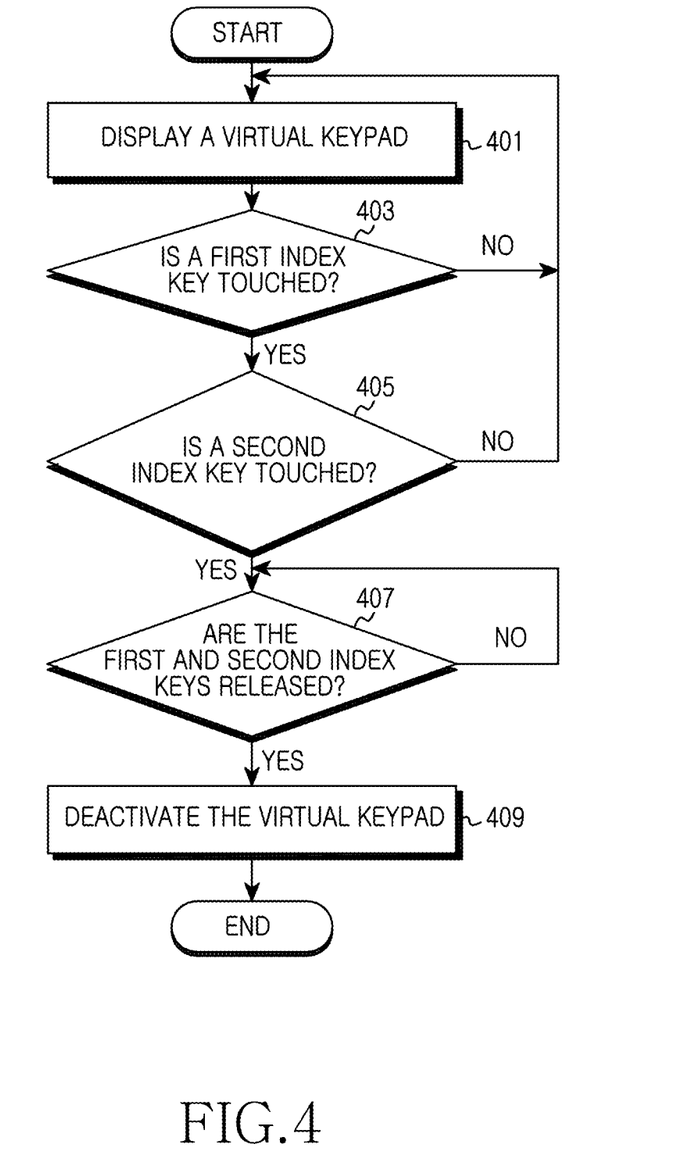
FIG. 4 is a flowchart of a method for reconfiguring a virtual keypad according to aspects of the disclosure.

FIG. 4 is a flowchart of a method for reconfiguring a virtual keypad according to aspects of the disclosure. In step 401, the electronic device 100 displays the virtual keypad 709 for inputting letters in a note application 721 on the touch screen 150 as shown in FIG. 7A. In step 403, the electronic device determines whether one or more keys in the keypad 709 are touched. When at least one key is touched, the electronic device determines whether key is a first index key. When the touched key is not an index key, the electronic device displays a symbol (e.g., a letter) associated with the touched key in the note application 721 and the process returns step 401. Otherwise, when the touched key is the first index key, the electronic device refrains from displaying the symbol associated with the touched key and the process proceeds to step 405.

In step 405, the electronic device determines whether a second index key is touched (e.g., pressed) within a predetermined time period from the touching of the first index key. When a second index key is not input within the predetermined time period, the electronic device treats the pressing of the first index key as an ordinary symbol (e.g., letter) input and thus displays the symbol associated with the first index key (e.g., the letter "F") in the note application 721. Afterwards the process returns to step 401. By contrast, if the second key is touched (or pressed) within the predetermined time period, the process proceeds to step 407.

In step 407, the electronic device determines whether the first index key and the second index key are released. If the two keys are not released, step 407 is repeated. Otherwise, if the two index keys are released the process proceeds to step 409. At step 409, the virtual keypad is deactivated and the process ends. For example, when the virtual keypad 709 detects the touch on the "F" key 701 and then detects the touch on the "J" key 711 within the predetermined time period as shown in FIG. 7A, the electronic device recognizes that the touches on the "F" key 701 and the "J" key 711 are not performed for the purpose of typing text into the note application 721. Thus, the electronic device refrains from providing the letters "F" and "J" to the note application 721. In some instances, the predetermined time period can be customizable by the user, and as such specified via a user input. Alternatively, the predetermined time period may be "hard-coded" or "hard-wired" into the electronic device by the electronic device's manufacturer. Although in this example, the virtual keypad is reconfigured by deactivating the virtual keypad, in alternative examples, as is discussed further below, reconfiguring the keypad may include changing the shape, size, and/or location of the keypad.

Figure 5A:
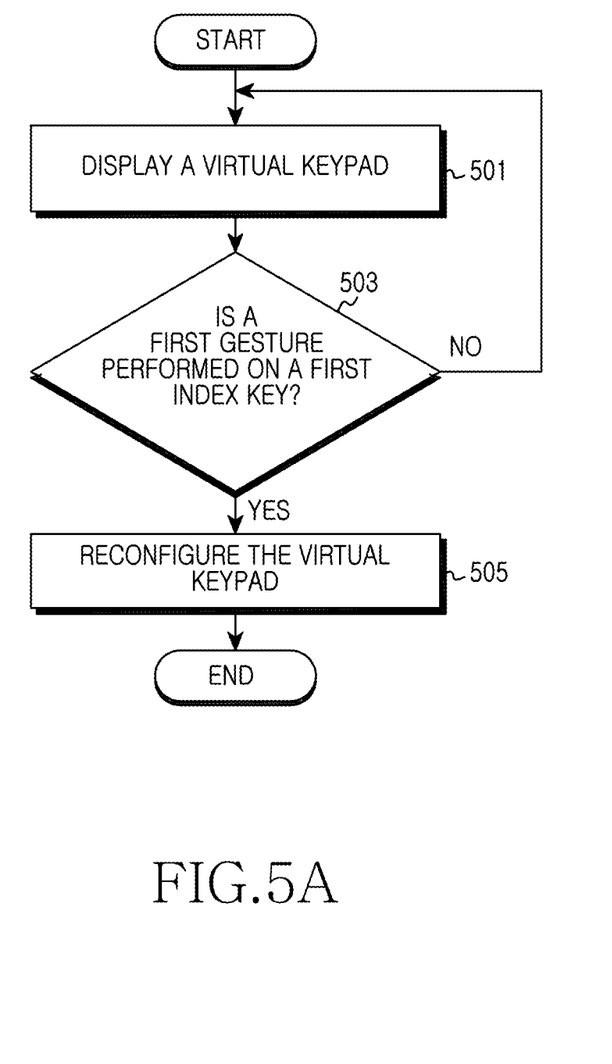
FIG. 5A is a flowchart of a method for reconfiguring a virtual keypad according to aspects of the disclosure.

FIG. 5A is a flowchart of a process for reconfiguring a virtual keypad in accordance with aspects of the disclosure. In step 501, the electronic device 100 displays a virtual keypad. For example, the virtual keypad 709, which is depicted in FIG. 7A, may be displayed.

In step 503, the electronic device 100 determines whether a first gesture is performed on an index key. As noted above, any key in the virtual keypad may be designated as an index key. For example, the "F" key 701 may be designated as an index key. The first gesture may be any suitable gesture that can be performed on the index key, such as a dragging gesture 713, which is illustrated in FIG. 7B. In some implementations, the dragging gesture 713 may be considered to have taken place if the first index key is dragged out of a touch detection region (e.g., a predetermined region in the virtual keypad where the touch on the index key is detected.) If it is determined that the first gesture is not performed, the process returns to step 501. Otherwise, if it is determined that the first gesture is performed, the process proceeds to step 505.

Figure 7E:
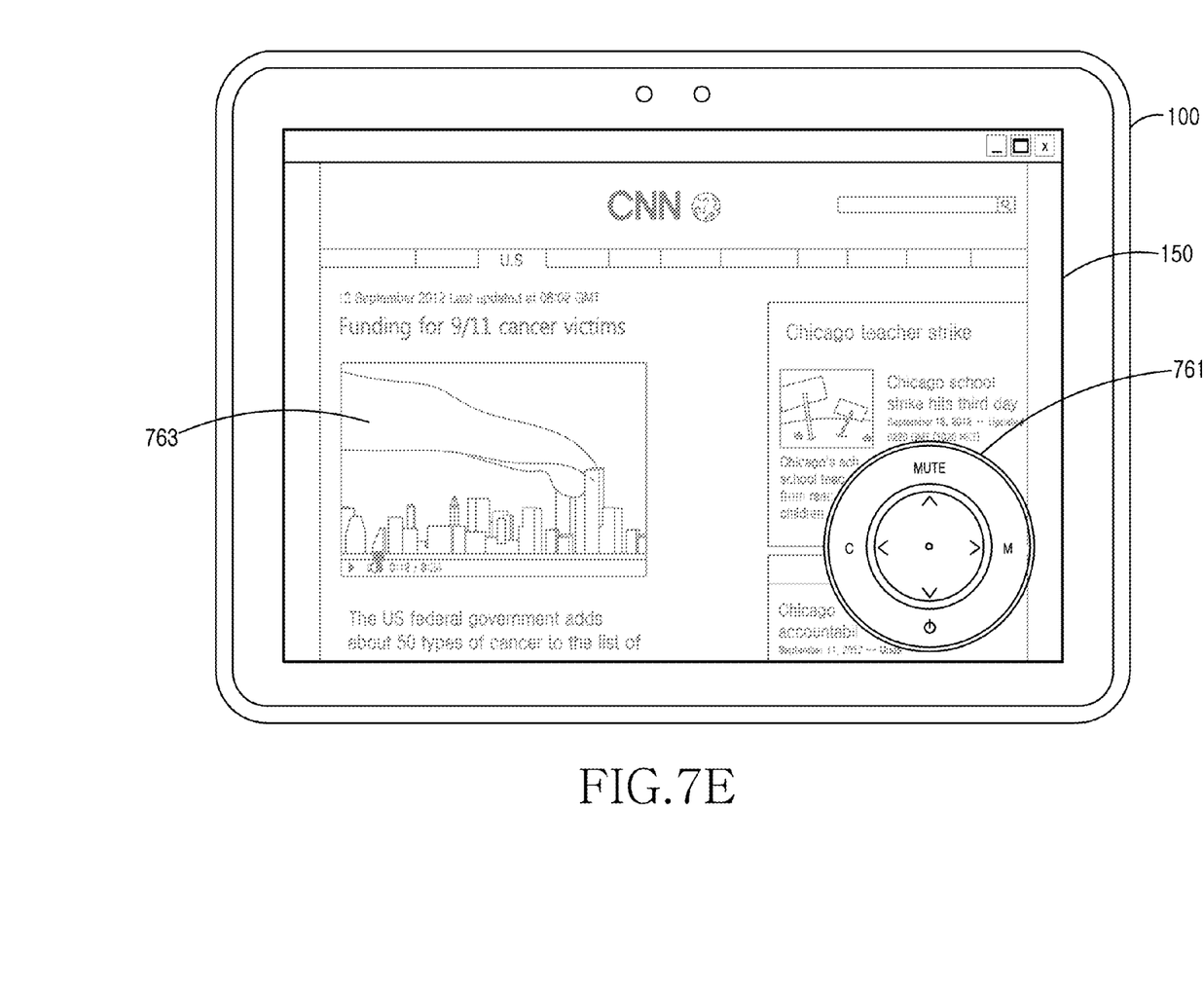

In step 505, the virtual keypad is reconfigured. In this example, reconfiguring the keypad may include changing the shape of the keypad, changing the type of the keypad, changing the location of the keypad, changing the size of the keypad, among others. More specifically, in one example, the re-configuration of the virtual keypad may include reducing the size of the virtual keypad by replacing the virtual keypad 709 with the keypad 741, as shown in FIG. 7C. In another example, the re-reconfiguration of the virtual keypad may include replacing the virtual keypad 709 with another type of alphanumeric virtual keypad. For instance, as shown as illustrated in FIG. 7D, the virtual pad 709 may be replaced with a virtual pad that has at least one characteristic that is not found in the virtual pad 709, such as a virtual keypad having fewer keys, different dimensions, different shape, different type of keys (e.g., keys special purpose keys such as "mute"), and/or different mappings between keys and symbols (e.g., letters, numbers, etc.). In yet another example, the re-configuration of the virtual keypad may include replacing the virtual keypad 709 with a special-purpose or (non-alphanumeric) keypad 761 for controlling playback of video 763, as shown in FIG. 7E. As illustrated in FIG. 7E, a non-alphanumeric pad may include a pad that is not capable of being used to input text (or numbers) into an application, such as the application 121.

Figure 5B:
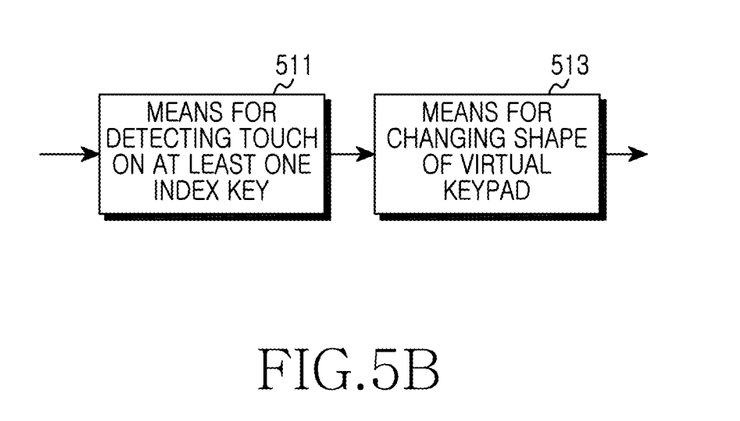
FIG. 5B is a diagram of the electronic device according to aspects of the disclosure.

FIG. 5B depicts the electronic device for reconfiguring a virtual keypad according to aspects of the disclosure. As illustrated, the electronic device can include a first means 511 for detecting the touch on at least one index key and a second means 513 for changing the shape of the virtual keypad. The first means 511 detects the touch on at least one index key. For example, the electronic device determines whether at least one of the "F" key 701 and the "J" key 711 of the virtual keypad 709 is touched as shown in FIG. 7A. Herein, the "F" key and the "J" key are assumed to be the index keys.

The second means 513 changes the shape of the virtual keypad. For example, when the drag is detected in the direction 713 while the "F" key 701 is still touched as shown in FIGS. 7A and 7B, the electronic device recognizes that the shape of the virtual keypad is changed. Herein, the drag can include the slide-out for dragging out of the touch detection region of the touch screen. Thus, the electronic device can replace the virtual keypad 709 with the keypad 741 as shown in FIG. 7C. For example, when detecting the drag on the preset index key, the electronic device may recognize the shape change of the virtual keypad and replace the virtual keypad 709 with the keypad 751 as shown in FIG. 7D. For example, when detecting the drag on the preset index key, the electronic device may recognize the shape change of the virtual keypad and replace the virtual keypad 709 with the special-purpose keypad 761 for controlling video playback, as shown in FIG. 7E.

Figure 6:
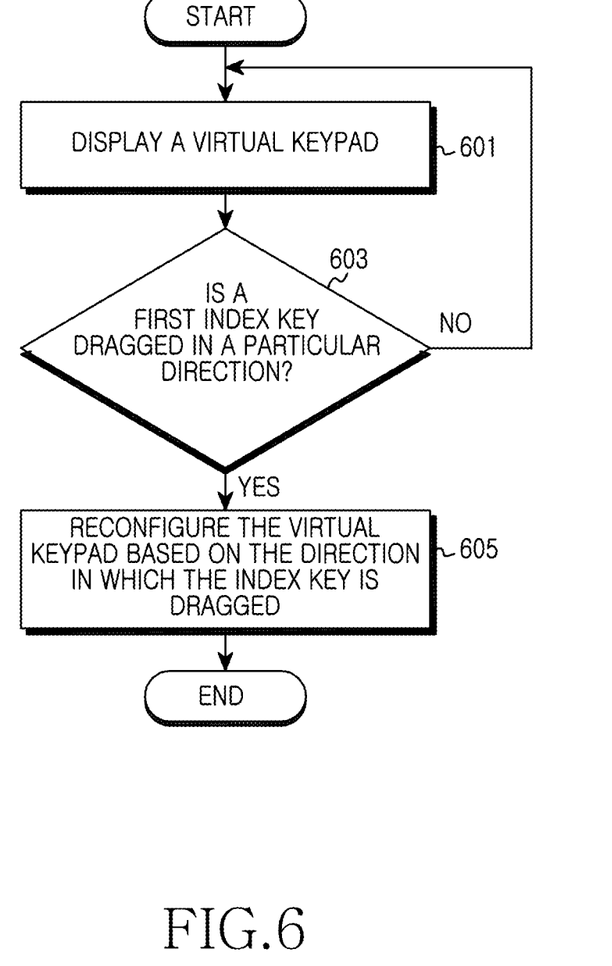
FIG. 6 is a flowchart of a method for reconfiguring a virtual keypad according to aspects of the disclosure.

FIG. 6 is a flowchart of a method for reconfiguring a virtual keypad according to aspects of the disclosure. In step 601, the electronic device 100 displays a virtual keypad. For example, the virtual keypad 709, which is depicted in FIG. 7A, may be displayed.

In step 603, the electronic device determines whether a first index key is dragged in a particular direction. As noted above, any key in the virtual keypad may be designated as an index key. For example, the "F" key 701 may be designated as an index key. For example, the index key may be dragged by a dragging gesture 713, which is illustrated in FIG. 7B. In some implementations, the dragging gesture 713 may be considered to have taken place if the first index key is dragged out of a touch detection region (e.g., a predetermined region in the virtual keypad where the touch on the index key is detected.) If it is determined that the first gesture is not performed, the process returns to step 601. Otherwise, if it is determined that the first gesture is performed, the process proceeds to step 605.

In step 605, the electronic device reconfigures the virtual keypad based on the direction. For example, if the index key is dragged in an upward direction, the electronic device may reduce the size of the virtual keypad by replacing the keypad 7009 with the keypad 741, as shown in FIG. 7C. As another example, if the index key is dragged in a upward direction, the electronic device may change the shape or type of the virtual keypad by replacing the keypad 709 with the keypad 761, as shown in FIG. 7E. As yet another example, if the index key is dragged in a downward direction, the electronic device may change the shape or type of the virtual keypad by replacing the keypad 709 with the keypad 761, as shown in FIG. 7D.

As set forth above, by virtue of the virtual keypad, the electronic device can take short breaks while the user's hand is still placed on the virtual keypad, and change the shape of the virtual keypad according to a situation so as to provide the function for the situation. Therefore, user's convenience can be provided.

It should be note that FIGS. 1-7E are provided as examples only. Some of the steps shown in FIGS. 3A, 4, 5A, and 6 can be performed in a different order, concurrently, or altogether omitted. Most of the foregoing alternative embodiments are not mutually exclusive, but may be implemented in various combinations to achieve unique advantages. As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "in accordance with one aspect," "such as," "including" and the like) should not be interpreted as limiting the disclosure to the specific examples; rather, the examples are intended to illustrate only one of many possible embodiments.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for"

While the disclosure has been shown and described with reference to certain examples, it will be understood by those skilled in the art that various changes in form and details may be made therein without departing from the spirit and scope of the disclosure as defined by the appended claims and their equivalents.

What is claimed is:

1. A method for providing a virtual keypad of a touch screen in an electronic device, comprising:
 detecting that a first key in the virtual keypad is touch;
 determining whether a second key in the virtual keypad is touched within a predetermined time period after the first key is touch;
 deactivating the virtual keypad, when the second key is touched within the predetermined time period;
 detecting a drag on at least one of the first key or the second key; and
 reconfiguring the virtual keypad in response to detecting the drag.

2. The method of claim 1, wherein the drag comprises a slide-out for dragging out of a touch detection region of the touch screen.

3. The method of claim 1, wherein the reconfiguring the virtual keypad comprises determining a position for displaying the virtual keypad based on a location of the dragged key that is the first key or the second key.

4. The method of claim 1, wherein the reconfiguring the virtual keypad comprises reconfiguring the virtual keypad based on a direction of the drag.

5. The method of claim 1, wherein reconfiguring the virtual keypad comprises moving the virtual keypad from a first location in a touchscreen to a second location in the touch screen based on a direction in which the first key is dragged.

6. The method of claim 3, further comprising:
 displaying the virtual keypad at a location opposite to the first location of the dragged key, when the dragged key is at a first location; and
 displaying the virtual keypad at a location opposite to the second location of the dragged key, when the dragged key is at a second location.

7. The method of claim 1, wherein reconfiguring the virtual keypad comprises replacing shape of the virtual keypad based on a direction of the drag.

8. The method of claim 7, wherein reconfiguring the virtual keypad comprises reducing the size of the virtual keypad by replacing shape of the virtual keypad.

9. The method of claim 1, wherein reconfiguring the virtual keypad comprises changing at least one of the number of keys in the virtual keypad, size of the virtual keypad, dimension of the virtual keypad, shape of the virtual keypad, type of keys in the virtual keypad, and/or mappings between keys and symbols in the virtual keypad.

10. The method of claim 1, further comprising:
 determining whether the first key is dragged, when the second key is not touched within the predetermined time period;
 deactivating the virtual keypad in response to determining the first key is dragged; and
 reconfiguring the virtual keypad.

11. An electronic device, comprising:
 a touchscreen configured to display a virtual keypad; and
 a processor configured to:
  detect that a first key in the virtual keypad is touch;
  determine whether a second key in the virtual keypad is touched within a predetermined time period after the first key is touch;
  deactivate the virtual keypad, when the second key is touched within the predetermined time period;
  detect a drag on at least one of the first key or the second key; and
  reconfigure the virtual keypad in response to detecting the drag.

12. The electronic device of claim 11, wherein the drag comprises a slide-out for dragging out of the touch detection region of the touch screen.

13. The electronic device of claim 11, wherein the processor configured to determine a position for displaying the virtual keypad based on a location of the dragged key that is the first key or the second key.

14. The electronic device of claim 11, wherein the processor configured to reconfigure the virtual keypad based on a direction of the drag.

15. The electronic device of claim 11, wherein reconfiguring the virtual keypad comprises moving the virtual keypad from a first location in a touchscreen to a second location in the touch screen based on a direction in which the first key is dragged.

16. The electronic device of claim 13, wherein the processor configured to
 display the virtual keypad at a location opposite to the first location of the dragged key, when the dragged key is at a first location, and
 display the virtual keypad at a location opposite to the second location of the dragged key, when the dragged key is at a second location.

17. The electronic device of claim 11, wherein the processor configured to replace shape of the virtual keypad based on a direction of the drag.

18. The electronic device of claim 17, wherein the processor configured to reduce the size of the virtual keypad by replacing shape of the virtual keypad.

19. The electronic device of claim 11, wherein the processor configured to change at least one of the number of keys in the virtual keypad, size of the virtual keypad, dimension of the virtual keypad, shape of the virtual keypad, type of keys in the virtual keypad, and/or mappings between keys and symbols in the virtual keypad.

20. The electronic device of claim 11, further comprising:
the processor configured to
 determine whether the first key is dragged, when the second key is not touched within the predetermined time period;
 deactivate the virtual keypad in response to determining the first key is dragged; and
 reconfigure the virtual keypad.

* * * * *